Jan. 21, 1941.  H. L. BROOKE  2,229,491
BUMPER GUARD STRUCTURE
Filed Oct. 9, 1939  2 Sheets-Sheet 1
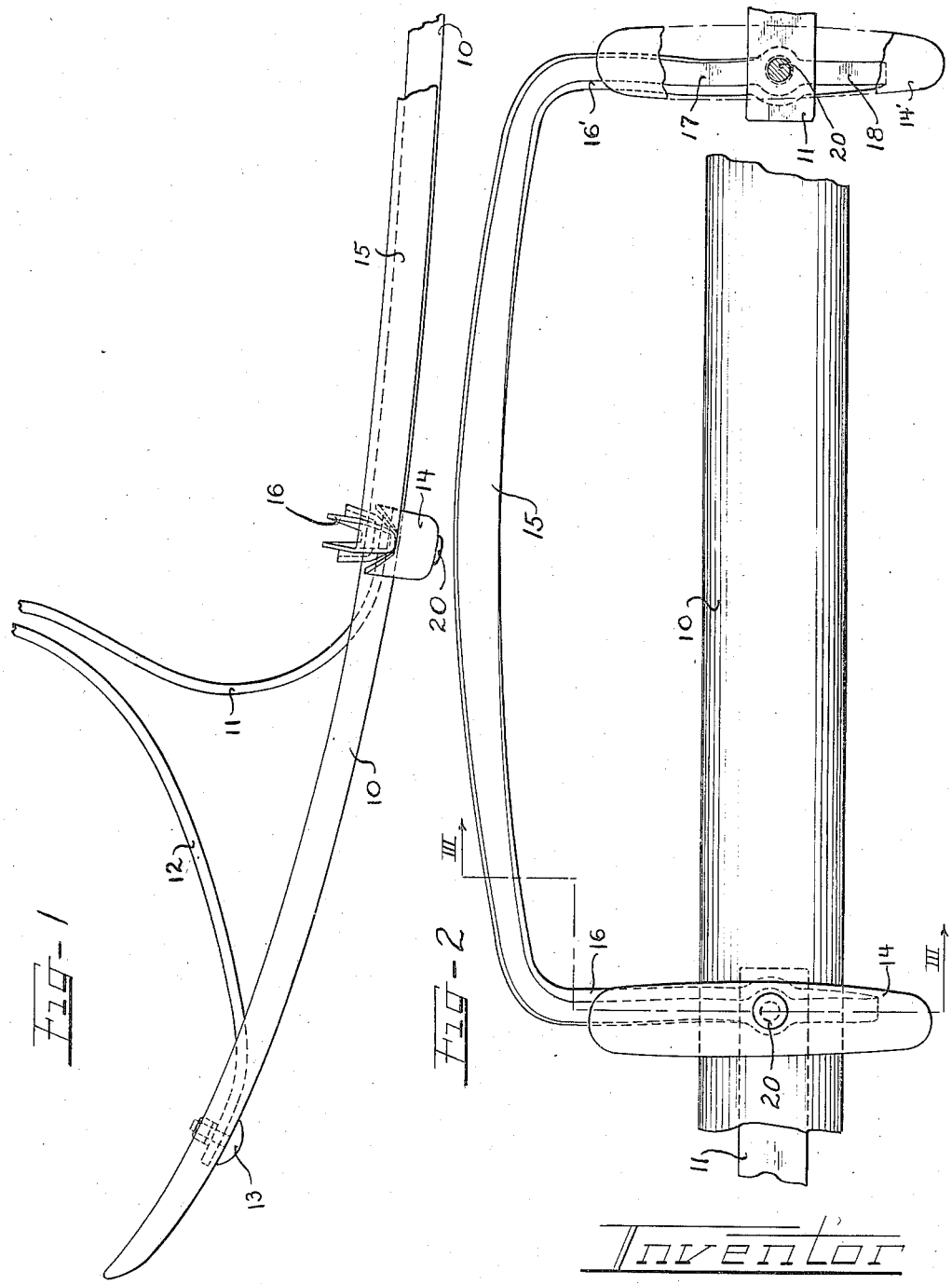
Inventor
HAROLD L. BROOKE
by Charles Hill Attys Jan. 21, 1941.  H. L. BROOKE  2,229,491
BUMPER GUARD STRUCTURE
Filed Oct. 9, 1939  2 Sheets-Sheet 2
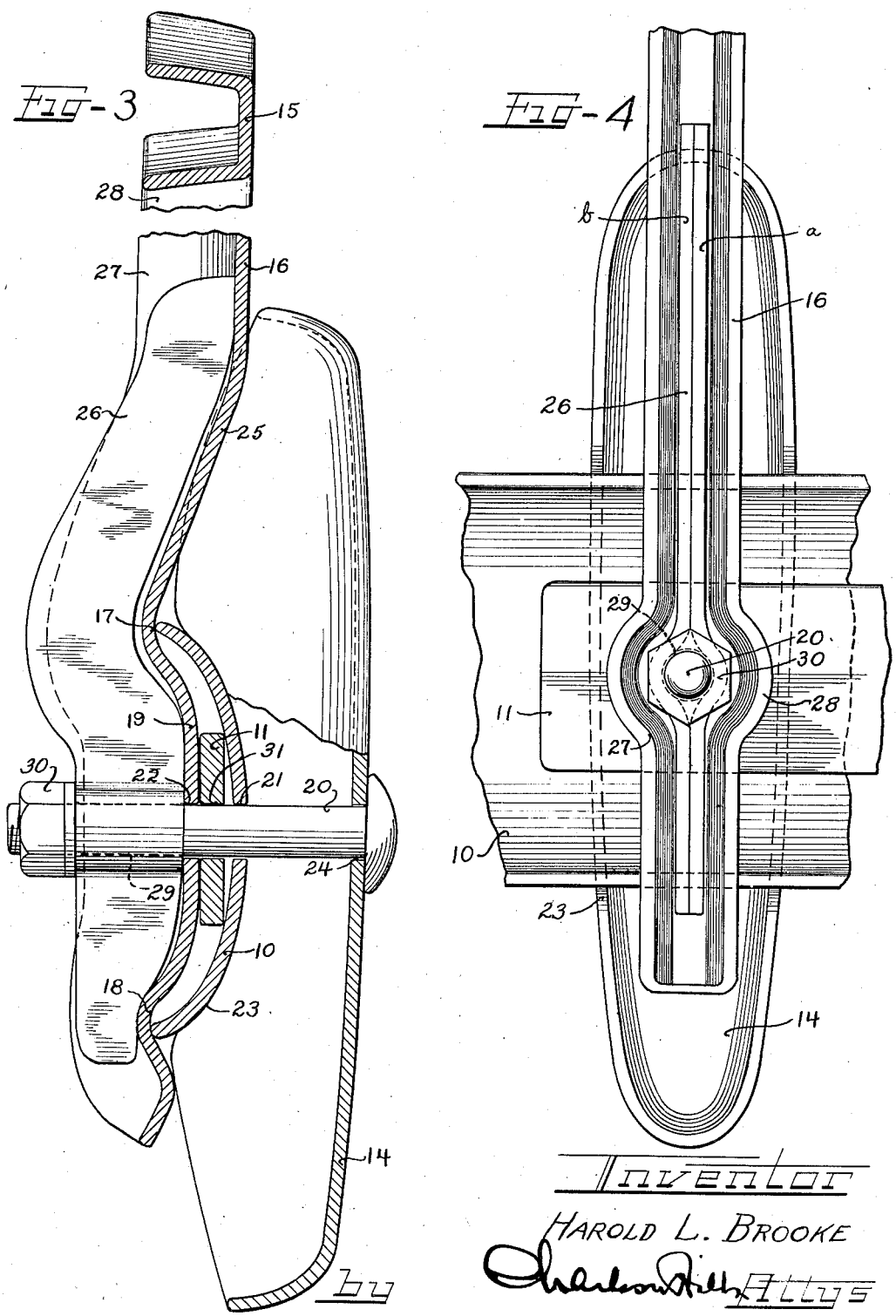
Inventor
HAROLD L. BROOKE Patented Jan. 21, 1941

2,229,491

UNITED STATES PATENT OFFICE 2,229,491

BUMPER GUARD STRUCTURE

Harold L. Brooke, Detroit, Mich., assignor to Houdaille-Hershey Corporation, Detroit, Mich., a corporation of Michigan Application October 9, 1939, Serial No. 298,548

4 Claims. (Cl. 293—55)

My invention relates to bumper guard structure and particularly to guard structure providing a guard rail above and extending in the direction of the bumper impact bar for protecting certain parts of an automobile, as for example a guard bar or rail structure for protecting the grille and the radiator structure of the automobile.

The important object of the invention is to provide improved means for mounting such guard structure on the bumper impact bar particularly where the guard structure has depending ends extending transversely of the impact bar and against the back of the impact bar.

A further feature of the invention is the shaping of the depending ends of a guard bar so that they will interlock with the rear edges of a convex impact bar to securely hold the guard structure against vertical displacement.

A further feature of the invention is the application of transverse guard members against the front face of the impact bar in front of the depending ends of the guard bar, and the provision of common means for intimately securing the guard members and the guard bar ends in position on the impact bar.

The various features of my invention are incorporated in the structure shown on the drawings, in which:

Figure 1 is a plan view of substantially one-half of a bumper structure showing my improved guard structure applied thereto;

Figure 2 is a front elevation of the middle portion of the bumper impact bar and the guard structure mounted thereon;

Figure 3 is a section on plane III—III Figure 2; and

Figure 4 is a rear elevation at one end of the guard structure.

Referring to Figure 1, the bumper impact bar 10 is at each of its end portions supported from the vehicle chassis by a pair of inner and outer supporting bars 11 and 12, the inner bar at its outer end deflecting inwardly to be secured to the impact bar and the outer supporting bar 12 inclining laterally outwardly to be secured to the impact bar as by means of a bolt 13.

The guard structure shown comprises two vertical guard members 14 and 14' engaging against the front of the impact bar at equal distances from the center line of the bar, and an auxiliary guard element in the form of a bar or rail 15 above the impact bar and between the vertical guards and having its ends 16 and 16' extending vertically downwardly behind the vertical guards 14 and 14' respectively and behind the impact bar.

The impact bar 10 is formed to present transversely a convex front face and a rear concave face. The guard bar or rail 15 is of U-shaped cross section and the ends 16—16' thereof have upper and lower indentations 17 and 18 for receiving the upper and lower rear edges of the impact bar with the portion 19 between the indentations projecting into the impact bar, as clearly shown on Figure 3. The indentations will serve to securely hold the guard bar against vertical displacement relative to the impact bar when its ends 16 are clamped to the impact bar. The clamping or securing means may be in the form of a bolt 20 extending through a hole 21 in the impact bar and a hole 22 in the portion 19 of the guard bar end. Where the vertical guards 14—14' are used, these guards may be of hollow or channel shape with their rear edges provided with recesses 23 for fitting the front convex face of the impact bar 10, and the front wall of each vertical guard may be provided with a hole 24 for receiving the bolt 20 so that this bolt will act as a common means for securing the corresponding vertical guard and guard bar end 16 to the impact bar 10. The portions 25 of the guard bar ends 16 and 16' between the upper vertical portions thereof and the upper indentations 17, may be inclined forwardly as shown on Figure 3 to bring the bar 15 in the desired position above the impact bar 10, the bar 15 in the arrangement shown being in vertical alignment with the impact bar 10 and is curved longitudinally to follow the longitudinal curvature of the impact bar.

In order to reinforce the ends 16 and 16' of the guard bar 15, a reinforcing bar structure 26 is provided for each end. This reinforcing bar structure is bent or shaped to fit against the inner side of the front wall of the respective guard bar end between the side walls 27 and 28 thereof, the reinforcing bar extending from the lower indentation 18 of the guard bar end and upwardly within the end to or beyond the upper end of the corresponding vertical guard 14 or 14'. The reinforcing bar structure is provided with a passageway 29 for receiving the corresponding bolt 20, the head of the bolt engaging against the outer wall of the vertical guard and the bolt nut 30 when screwed on abutting the outer side of the reinforcing bar 26 so that the vertical guard, the corresponding end of the guard bar 15, and the reinforcing bar 26 are drawn together to securely clamp the impact bar 10 between the vertical guard and the guard bar end to thus hold the guard structure assembly firmly to the impact bar.

As shown, the reinforcing bar structure 26 may be formed of two plates *a* and *b* welded together and deflected to provide the passage 29 for the bolt 20. To accommodate the deflected bolt passageway receiving portion, the side walls 27 and 28 of the corresponding guard bar end may be deflected, as clearly shown on Figure 4.

The bolts 20 which clamp the guard structure assembly to the bumper impact bar may serve also to secure the impact bar to the outer ends of the inner supporting bars 11. As clearly shown on Figure 3, the laterally deflected outer end of the inner supporting bar 11 extends between the back of the impact bar and the portion 19 of the corresponding end of the guard bar 15, the bar 11 having a bolt hole 31 through which the bolt 20 extends. The arrangement is such that when the bolt 20 is tightened up, the bar 11 will be securely clamped between the impact bar and the end 16 of the guard bar. A common securing means, such as a bolt 20, will therefore rigidly secure together an assembly including the impact bar and its supporting bar, the vertical guard, an end of the guard bar, and the reinforcing bar for the guard bar end.

I have shown a practical and efficient embodiment of my invention, but I do not desire to be limited to the exact construction and arrangement shown and described, as changes and modifications may be made without departing from the scope of the invention.

I claim as follows:

1. An automobile bumper and guard structure assembly comprising a horizontally extending bumper impact bar having upper and lower rearwardly extending edges, a vertical guard element of U-shaped cross section behind said impact bar and having its side walls extending rearwardly and its yoke portion indented to receive said impact bar edges, a reinforcing bar structure extending between the side walls and against the rear side of the yoke of said guard element, and a bolt extending through said impact bar, said guard element and said reinforcing bar structure to hold them rigidly together.

2. An automobile bumper and guard structure assembly comprising a horizontally extending bumper impact bar transversely curved to present a convex front face and a concave rear face, a vertical guard element recessed to fit the front face of said impact bar, an auxiliary guard element at the rear side of said impact bar and recessed to receive the upper and lower edges of the impact bar, and securing means engaging said vertical guard and said auxiliary guard for clamping the impact bar between them.

3. An automobile bumper and guard structure assembly comprising a horizontally extending bumper impact bar transversely shaped to present a convex front face and a concave rear face, a vertical front guard member shaped to fit the front face of said impact bar, a rear vertical guard member behind said impact bar having indentations for receiving the upper and lower edges of said impact bar and with its portion between said indentations extending partially into the concavity of said impact bar, a supporting bar for the impact bar extending between the impact bar and said portion of the rear vertical guard extending into the impact bar, and a common securing means for clamping said vertical guard members and said supporting bar and impact bar together.

4. An automobile bumper and guard structure assembly comprising a horizontally extending impact bar transversely curved to present a convex front face and a concave rear face, spaced apart guard elements extending transversely and in front of said impact bar and recessed to fit the front face of said impact bar, an auxiliary guard element of inverted U-shape having its yoke part extending above and paralleling said impact bar and with its legs extending transversely behind said impact bar and said guard elements, said legs being recessed to receive the upper and lower edges of said impact bar, and securing means engaging said guard elements and the legs of said auxiliary guard element for clamping the impact bar between them.

HAROLD L. BROOKE.